Sept. 12, 1967        D. EOLKIN        3,341,280

STERILIZATION APPARATUS AND METHOD

Filed June 20, 1963

INVENTOR.
DAVE EOLKIN
BY
Townsend and Townsend
ATTORNEYS

# United States Patent Office 3,341,280
Patented Sept. 12, 1967

3,341,280
STERILIZATION APPARATUS AND METHOD
Dave Eolkin, San Lorenzo, Calif., assignor to Norda
Essential Oil and Chemical Co., New York, N.Y.
Filed June 20, 1963, Ser. No. 289,278
9 Claims. (Cl. 21—58)

This invention relates to the sterilization of particulate materials. More specifically, it relates to apparatus and a method for sterilizing particulate materials using fluidized bed techniques so that continuous production is made possible. A most significant aspect of the invention is in the fact that although a fluidized bed is used and production is on a continuous basis, sterilizing gas loss exteriorly of the treatment zone is prevented.

Figure 1:
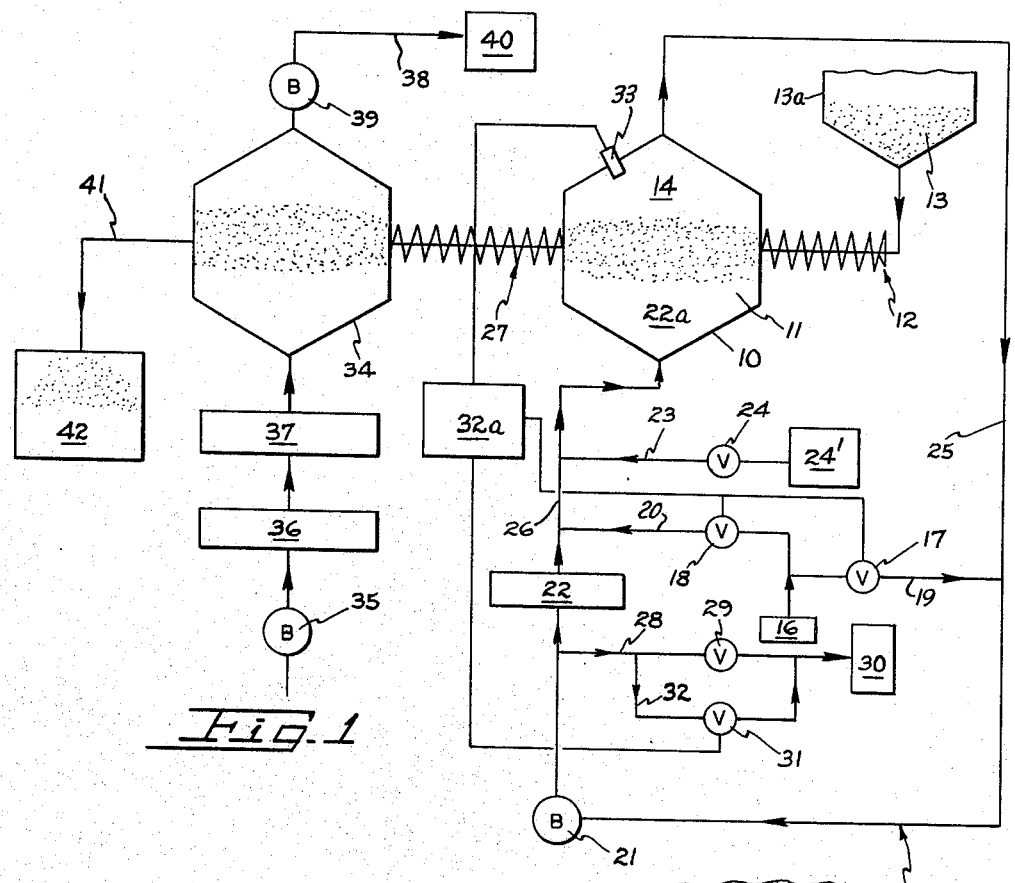
FIG. 1 is a schematic view illustrating apparatus for executing the sterilization of dry particulate materials in accordance with the present invention.

Previously, it has been the practice to use certain gases and vapors in order to sterilize or substantially reduce microorganism populations in dry particulate or granular materials such as food. A number of patents have been granted describing the use of such a concept in relation to batch-type methods. In these batch methods, a chamber containing the particulate material is first evacuated to vacuum, or substantially vacuum conditions, and is then filled with a sterilizing gas. The powder to be sterilized is held in contact with the sterilizing gas for a prescribed period of time at a predescribed temperature. The vacuum is again drawn on the chamber and the sterilizing gas removed. Finally, the vacuum is released with sterile air.

The above described prior method overcomes a number of problems encountered when gas sterilizing particulate materials such as food. These problems relate to the fact that the most widely used sterilizing gases, i.e., ethylene oxide and propylene oxide are toxic to human beings and, when mixed with air, are inflammable and explosive. In the above batch-technique, it is possible to avoid leakage of the sterilizing gases from the working system so as to create hazards.

On the other hand, these prior methods have a number of disadvantages. The more important ones include the fact that they are time consuming, with the gas-particle contact sometimes being measured in hours. Further, large volume production requires large heavy gauge expensive treatment chambers capable of resisting the atmospheric pressure exerted thereon during the existence of vacuum conditions within the treatment chamber. Also, since most sterilizing gases are more effective at higher temperatures, it is advantageous to carry out the sterilization at elevated temperatures. Unfortunately, it is difficult to optimize the working temperatures with the prior methods. Finally, and in line with the difficulty of optimizing temperatures, the prior methods are characterized by the difficulty of optimizing humidity in the treatment chamber, although the common sterilizing gases require control of humidity for best results.

The present invention provides a way of avoiding all of the disadvantages of the prior methods and provides significant features and advantages in other areas. In accordance with the present invention, there is provided apparatus for sterilizing particulate materials comprising a treatment chamber adapted for fluidizing particulate material. It further includes means for supplying a fluidizing-sterilizing gas to said chamber, and means for introducing particulate material to be sterilized into said chamber. Means are provided for discharging particulate matter from the chamber after the sterilization thereof, along with means for preventing the external escape of said gas from the treatment chamber during the introduction, fluidization and sterilization therein, and discharge therefrom of particulate material. The prevention means includes an exhaust-recycle system adapted for removing used fluidizing-sterilizing gas from the treatment chamber, for creating negative pressure therein, and for recycling the used gas back to said treatment chamber.

As noted above, there are a number of advantages in using the present fluidized bed sterilizing apparatus in accordance with the method to be more fully described hereinafter. These include the fact that the fluidized bed type of sterilization offers an intimate gas particle contact, in a dynamic or no dead spot "system," that permits precise control of sterilizing gas concentration, humidity, and temperature to a degree not possible with any of the prior apparatus and methods. At the same time, the system and apparatus eliminates and safeguards against the release of toxic materials into the surrounding work area which would otherwise create a health hazard for the workers. Because of the intimate gas particle contact conditions possible in the present apparatus, and because temperature, humidity, and concentrations are easily adjusted to optimum values, the processing time is dramatically decreased as compared with prior techniques. Further, since sterilizing gas losses from the system are minimized, a greater economy is possible in the over-all operation.

A number of features of the present apparatus are directed to the prevention of loss of sterilizing gas to the ambient atmosphere to thereby make possible the adaption of fluidized bed techniques. In the preferred embodiment these include the use of a novel type of particle conveyors for introducing material to be sterilized into the sterilizing zone, and then for removing the sterilized materials from the sterilizing zone. Thus, the preferred embodiment includes conveyors of the auger type which include a yieldable closure member that permits particles to be conveyed into the treatment zones (or out of the treatment zone as the case may be) during operation of the conveyor, while at other times preventing exterior movement of the sterilizing gas from the treatment zone. To further insure that gas from within the treatment zone will not escape through the conveyors during ingress and egress of the particulate materials, a slightly reduced pressure with respect to the external atmospheric pressure is maintained in the treatment zone. Thus the tendency of gas movement is towards the interior of the zone rather than for the treatment gases tending to escape from the zone. This condition is maintained by the use of a recycle system and a controlled bleed of gas from the recycle system that will be more fully described hereinafter.

In connection with the above, the reduced pressure in the treatment zone is assured by means of a safety system that is responsive to the pressure in the treatment zone. If the pressure increases beyond a safety point, the safety system prevents sterilizing gas from entering the system until sterilizing zone pressure is reduced to a safe point. This safety system includes appropriate valves and conduits for release of excess gases from the apparatus.

The apparatus and method are preferably employed in combination with the removal of residual sterilizing agent after the sterilization step. Thus the apparatus preferably includes a fluidized bed chamber for receiving the sterilized material directly from the sterilization zone. The residual gas necessarily present with the sterilized particles is conveniently removed by fluidizing the material with sterile air. The air from the fluidized bed is suitably sent to an absorber to prevent contamination of the ambient atmosphere.

As used herein, the terms fluidizing-sterilizing gas or sterilizing gas are used interchangeably, and in the broadest sense. It should be construed to mean any and all operable sterilizing gases and vapors suitable for eliminating, or at least reducing, the microorganism level in material to be sterilized. Typical examples of such materials include ethylene oxide, propylene oxide, formaldehyde, methyl bromide, beta propiolactone, alkyl pryrocarbonates, ammonia, epichlorhydrin, epibromohydrin, ethylene imine, ethylene sulfide, glycidaldehyde, propylene imine, chloropicrin, ozone, and the like. These materials may be used alone or in various combinations with other sterilizing gases or in combination with inert carrier gases such as nitrogen, oxygen, or air.

The apparatus and methods are adapted for use with any types of particulate material which may be fluidized with a gas. It is contemplated that the present invention will find great utility in the sterilization of dry powdered foods such as spices.

Turning to the drawings, FIG. 1 in particular, a suitable treatment zone or chamber is shown at 10. Treatment chamber 10 includes a porous plenum 11 of the type found in conventional fluidizing bed chambers. A conveyor 12 provides a flow of dry particulate material from hopper 13a to side 14 of the interior of chamber 10. A conduit circuit shown generally at 15 provides a flow of sterilizing gas for the combined purpose of fluidizing and sterilizing the material 13 in side 14 of chamber 10. Suitable sterilizing gas from source 16 enters conduit circuit 15 through valves 17 or 18 via conduits 19 or 20, respectively. A blower 21 suitably inserted in conduit 15 supplies the propulsion force for the gases in circuit 15 in the direction of the arrows.

Bed temperatures in chamber 10 are easily adjusted to the optimum value by adjustment of the heater 22. The sterilizing gas passes through heater 22 on its way to side 22a of chamber 10 for passage through porous plenum 11.

The moisture level in chamber 10 may be adjusted by introducing water in a suitable form such as steam through conduit 23 from source 24¹. The quantity of steam introduced is controlled by the correct positioning of valve 24.

Conduit circuit 15 may be considered as comprising a side 25 extending between side 14 of chamber 10 and blower 21, and a side 26 extending between blower 21 and side 22a of chamber 10.

In operation, sterilizing gas enters side 22 of chamber 10 from conduit side 26. The gas proceeds upwardly through porous plenum 11 and fluidizes the material 13 thereabove. During fluidization, and under selected temperatures and moisture conditions suitable for the material 13 being processed, sterilization rapidly occurs. The used gas that has just contacted the material 13, leaves side 14 through conduit side 25 under impetus from blower 21. Sterilized material continuously leaves side 14 of chamber 10 through conveyor 27 while new material to be sterilized continuously enters through conveyor 12.

Conveyors 12 and 27 are of a type that permits substantially only material 13 to enter and leave side 14 of chamber 10. These conveyors may be of any suitable type for accomplishing such a result such as the rotary valve type. Preferably, they are of the type illustrated in detail in FIG. 2 to be described more fully hereinafter. In any case, however, a small amount of external atmosphere will necessarily be admitted through conveyor 12 into side 14 of chamber 10. At the same time, and as previously mentioned, it is a significant feature of the invention that none, or substantially none, of the sterilizing gas within chamber 10 is permitted to escape to the ambient atmosphere. These two phenomena are made compatible as follows:

A slightly negative pressure is created in side 14 of chamber 10 by carefully balancing the amount of input through conduits 19, 20 (and 23 if desired) and bleed through conduit 28. This negative pressure in side 14 (which may be on the order of about 10 mm., although subject to wide variation as the particular apparatus may require) is created by blower 21 operating within the recycle conduit system 15.

Reduced pressure in side 14 is maintained in face of the incoming atmosphere through conveyer 12 by bleed line 28 in cooperation with valve 29. Valve 29 is opened and adjusted to permit the discharge of gas through line 28 approximately equal to the volume of gas entering side 14 through conveyor 12, and the reduced pressure in side 14 is thereby maintained.

The bleed gas discharged through line 28 is preferably sent to a suitable absorber 30 to prevent contamination of the surrounding atmosphere. Absorber 30 may be any suitable device for the purpose. Since most of the sterilizing gases are water soluble, absorber 30 may be a device suitable for dissolving the discharged gas in water.

As a further safety feature of the apparatus, there is provided a dump valve 31 which bypasses bleed valve 29 by way of conduit 32. Dump valve 31 is designed to release excessive amounts of pressure from conduit circuit 15 which may develop for any reason. In the preferred embodiment dump valve 31 is actuated by a suitable control 32a. Control 32a is linked to side 14 of chamber 10 through a pressure sensing device 33. When pressure sensing device 33 senses a predetermined level of pressure in side 14 of chamber 10, a signal is imparted to control 32a which in turn causes dump valve 31 to open for a time sufficient to permit the discharge of gas from conduit circuit 15 to reduce the pressure in the apparatus to the desired level. When the desired level is reached as determined by sensing device 33, control 32a causes valve 31 to close. At the same time, control 32 is suitably linked to valves 17 and 18 for the closing thereof during the time that valve 31 is opened, and vice versa.

The sterilized material leaves chamber 10 via conveyor 27. A residual amount of sterilizing gas is generally associated with the sterilized particles. Therefore, it is preferable to remove this residual sterilizing gas before further handling or using the sterile material. To accomplish this, and in accordance with the preferred embodiment, the sterilized material is delivered to a degassing chamber 34 wherein the sterile material is again fluidized. In this case, however, a sterile inert gas, such as air, is used as a fluidizing gas. Fluidizing pressure is suitably developed by means of a blower 35. The gas utilized may be filtered through a bacteriological filter 36 if required to prevent recontamination of the sterile particles. The air may be heated as desired by heater 37 before passing upwardly through the degassing chamber 34.

The air, in fluidizing and contacting the sterile particles, removes the residual gas and carries it upwardly through discharge line 37 under impetus of suction blower 39. The air and residual sterilizing gas is then preferably disposed of through a suitable absorber 40. The sterilized material with the residual sterilizing agent removed is then discharged from chamber 34 through conduit 41 to a suitable storage container 42.

Figure 2:
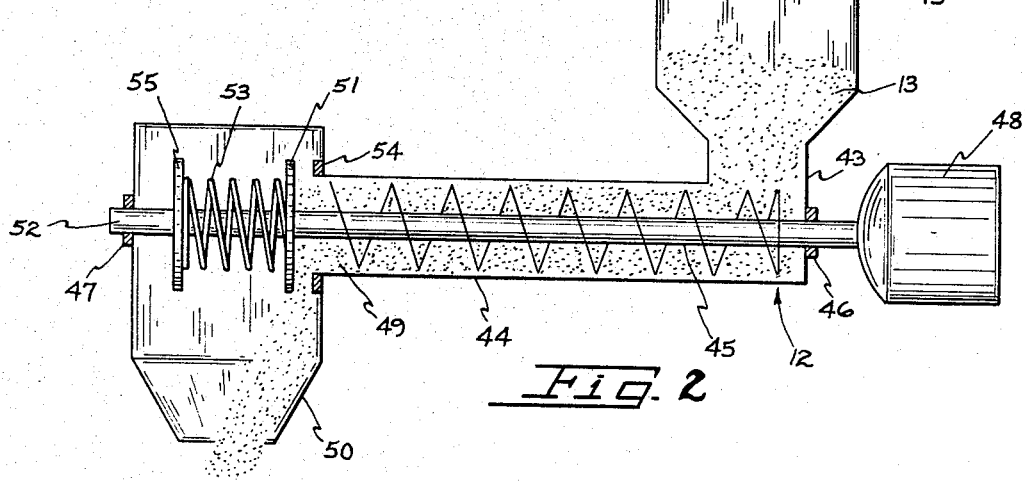
FIG. 2 shows schematically and in enlarged detail the conveyors included in the apparatus of FIG. 1.

The conveyor construction is illustrated more clearly in FIG. 2. Conveyors 12 and 27 are substantially identical and conveyor 12 is shown in FIG. 2 as illustrative of the construction of both. As seen in FIG. 2, material to be sterilized is fed into conveyor 12 through a neck 43 and into a tubular body 44 of conveyor 12. An auger 45 is disposed longitudinally through body 44 and is rotatably mounted on gas-tight bushing 46, 47 at either end thereof. A motor 48 is suitably connected to auger 45 for the rotation thereof.

As the particles 13 enter through neck 43, they are moved to the left as seen in FIG. 2 by the rotation of auger 45 in conventional fashion. As particles 13 are moved to the left they are discharged from end 49 of body 44. The particulate material 13 may then be guided into treatment chamber 10 by a suitable conduit 50.

To prevent sterilizing gas from backing up and leaking out from chamber 10 through body 44 to the surrounding atmosphere, a yieldable closure plate 51 is attached to auger shaft 52 for unitary rotary movement therewith. Plate 51 is also adapted for slidable movement longitudinally with respect to shaft 52. Compression spring 53 normally urges closure plate 51 against plate seat 54 to thereby seal the interior of body 44 from conduit 50. Backing plate 55 is releasably secured to shaft 52. Movement of plate 55 permits the tension on spring 53 to be adjusted.

When particulate matter 13 is moved along through body 44 and through end 49, the particles urge plate 51 to the left by compressing spring 53 so that the particulate matter may be discharged into conduit 50 as shown. As soon as flow of particulate material ceases, plate 51 is urged into sealing relationship with seat 54 by spring 53. As a result, movement of particles and gas or fluid is substantially only in the direction of the movement created by auger 45. Consequently, the only external gas entering conduit 50 and chamber 10 therefrom is the air necessarily intermixed with the particulate material 13 being processed.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A continuous method for sterilizing a particulate material comprising introducing said material into an enclosed treatment zone, fluidizing the material in said zone with a sterilizing gas to sterilize the same, discharging the sterilized material from said zone while introducing more material to said zone to be sterilized, and continuously maintaining the gas pressure in said treatment zone above the fluidized material at a preselected pressure below the external atmosphere by removing gas from said treatment zone, and recycling only a portion of the removed gas whereby said introducing, fluidizing and discharging steps result in substantially no contamination of the ambient atmosphere with said sterilizing gas.

2. A method in accordance with claim 1 and including the step of introducing said discharged material into another treatment zone, and then fluidizing the material with sterile air to remove residual sterilizing gas from the material.

3. A method for sterilizing a particulate material comprising introducing said material into an enclosed treatment zone in combination with a limited quantity of external atmosphere, sterilizing the material in said zone by flowing sterilizing gas through the zone and through the material therein to fluidize the material, flowing gas out of the treatment zone after fluidizing the material, and recycling the gas at a sufficient rate, while bleeding a portion thereof, to establish a reduced pressure relative to the ambient atmosphere in the treatment zone to avoid sterilizing gas loss to the ambient atmosphere.

4. A method in accordance with claim 3 and including the steps of heating the sterilizing gas before flowing it through said treatment zone, and adding moisture thereto to provide preselected sterilizing conditions in the treatment zone.

5. A method in accordance with claim 3 wherein said gas volume and pressure is decreased by bleeding a volume of gas being recycled approximately equal to the limited quantity of gas introduced in combination with material to be sterilized.

6. Apparatus for sterilizing particulate materials comprising: a particle fluidizing chamber substantially sealed to the ambient atmosphere; a source of fluidizing-sterilizing gas; means for supplying fluidizing-sterilizing gas from said source to said chamber; conduit means connected for recycling said fluidizing-sterilizing gas following its fluidization of particles in the chamber for re-use in said chamber; gas propulsion means associated with the recycling conduit means for establishing a reduced pressure relative to the ambient atmosphere in said fluidization chamber above a fluidized particle bed formed therein; means for supplying particles to said chamber to be sterilized; sealing means associated with said supplying means to limit the quantity of atmosphere introduced with the particles; and means for removing a portion of the gases in said chamber and recycling conduit means at a preselected rate sufficient to maintain a preselected reduced pressure in the chamber above said fluidized particle bed and thereby prevent contamination of the ambient atmosphere.

7. Apparatus in accordance with claim 6 wherein said means for removing a part of the gas in the chamber and conduit means includes a bleed valve adjustable to release a relatively small steady flow of gas commensurate with the gas volume introduced with particulate material into said chamber.

8. Apparatus in accordance with claim 6 and including pressure sensing means in said chamber, and valve means responsive to said pressure sensing means operable to continuously adjust the gas pressure in said chamber to a predetermined reduced level relative to the ambient atmosphere.

9. Apparatus for sterilizing particulate materials comprising: a treatment chamber, a porous plenum disposed in said chamber to divide the chamber into a first side and a second side, a conduit circuit establishing fluid communication between the first and second sides of said chamber, fluid propulsion means associated with said conduit circuit intermediate said first and second chamber sides for moving fluid at a controllable rate through said conduit from said first chamber side to said second chamber side, said conduit circuit thereby being divided to define a first conduit side between said first chamber side and fluid propulsion means and a second conduit side between said second chamber side and fluid propulsion means, fluidizing-sterilizing gas input means in fluid communication with each of said first and second conduit sides for admitting a controlled quantity of said gas therein; a first conveyor for introducing particulate material into said first chamber side comprising a tubular body, an auger disposed longitudinally therein of a radius substantially equal to the interior radius of said body, an input opening at one end of said body, an outlet opening at the opposite end of said body, and a yieldable closure member at said outlet opening adapted for movement away from said outlet opening when pressure is applied thereto by materials which may be propelled through said body by said auger, means for returning said cover into closing relationship with said outlet opening in the absence of material being moved through said tube by said auger and means for rotating said auger, a second conveyor for discharging dry particulate material after sterilization from said first chamber side of the same construction as said first conveyor, and outlet means in fluid communication with said first conduit side adapted for controllably releasing gas from said first conduit side, said fluid propulsion means, in cooperation with said input and outlet means, being adjustable to permit a flow of fluidizing-sterilizing gas from said second chamber side to said first chamber side through said plenum to thereby fluidize and sterilize particulate matter in said first chamber side, said fluid propulsion means being adapted for recycling said fluidizing-sterilizing gas through said conduit circuit at a rate sufficient to create negative pressure in said first chamber side.

References Cited

UNITED STATES PATENTS

| | | | |
|---|---|---|---|
| 1,036,243 | 8/1912 | Hooker | 99—153 X |
| 2,014,617 | 9/1935 | Fischer | 214—17.4 |
| 2,075,845 | 4/1937 | Gross et al. | 99—225 |
| 2,107,697 | 2/1938 | Griffith et al. | 21—58 X |
| 2,428,995 | 10/1947 | Rogers | 241—17.4 |
| 2,506,317 | 5/1950 | Rex | 23—288 X |
| 2,529,710 | 11/1950 | Singh | 99—153 |
| 2,583,255 | 1/1952 | Clark | 23—288 X |
| 2,655,437 | 10/1953 | Garbo | 23—288 |
| 2,876,557 | 3/1959 | Ducatteau | 23—288 |
| 2,900,246 | 8/1959 | Keith et al. | 75—26 |
| 2,952,513 | 9/1960 | Wigton | 23—87 |
| 3,036,919 | 5/1962 | Kretschmer et al. | 99—153 |

MORRIS O. WOLK, *Primary Examiner.*

J. SCOVRONEK, *Assistant Examiner.*